United States Patent [19]

Arrowsmith

[11] 4,247,658

[45] Jan. 27, 1981

[54] SURFACE TREATED POLYESTER SUBSTRATES

[75] Inventor: Robert J. Arrowsmith, Charlotte, N.C.

[73] Assignee: Fiber Industries, Inc., Charlotte, N.C.

[21] Appl. No.: 4,967

[22] Filed: Jan. 22, 1979

Related U.S. Application Data

[60] Continuation of Ser. No. 802,607, Jun. 2, 1977, abandoned, which is a division of Ser. No. 287,123, Sep. 7, 1972, Pat. No. 4,044,189.

[51] Int. Cl.² ............................................. C08J 9/26
[52] U.S. Cl. .................................. 521/182; 428/295; 521/61; 521/63
[58] Field of Search ........................ 521/182, 61, 63

[56] References Cited

U.S. PATENT DOCUMENTS

| 3,329,557 | 7/1967 | Magat et al. | 260/2.5 N |
| 3,542,715 | 11/1970 | White et al. | 260/2.5 E |
| 3,682,846 | 8/1972 | Sano et al. | 264/49 |
| 4,044,189 | 8/1977 | Arrowsmith | 264/210.7 |

Primary Examiner—Morton Foelak
Attorney, Agent, or Firm—Andrew F. Sayko, Jr.

[57] ABSTRACT

A textile or textile-like polyester element having improved adhesion to rubber and being characterized by a high surface energy, a chemically unmodified surface and a coating which is a crystallizing agent for the polyester substrate.

1 Claim, 3 Drawing Figures

SURFACE TREATED POLYESTER SUBSTRATES

This is a continuation of application Ser. No. 802,607, filed June 2, 1977, now abandoned; which in turn is a division of Ser. No. 287,123 filed Sept. 7, 1972 now U.S. Pat. No. 4,044,189.

This invention relates to polyester shaped articles, and more specifically, to polyester shaped articles having improved adhesion to rubbery compositions.

Rubbery materials requiring high tensile strength are commonly reinforced with textile materials, for rubber goods articles such as for instance, pneumatic tires, continuous belts, industrial brake diaphragms, bridgepads, and the like. Reinforcing textile elements are primarily selected from rayon, nylon and polyester textile filaments. While rubber adhesion difficulties for rayon and nylon have partially been resolved, polyester textile elements generally exhibit poor rubber adhesion. However, in view of the exceptional strength of polyester fibers, polyester has still found wide acceptance as a reinforcing element in rubber goods.

Polyester films are frequently slit into textile-like ribbons or are fibrillated into yarn-like products. These ribbons or fibrillated yarns also possess a poor affinity for rubber. When such polyester materials are tufted into carpet backing, it is necessary that the resultant pile yarns be locked into the backing with a latex coating. The poor adhesion of polyester for the backing material, however, frequently results in the failure of the polyester pile to be adequately secured to the backing.

One type of polyester textile or textile-like element having improved adhesion for rubber is the polyester element having a coating disposed thereon which coating is more amenable to being adhered to rubber. Such coatings are commonly chemically reacted with the polyester substrate; that is to say, the coatings cannot be removed by solvent stripping. Examples of such chemically reacted prior art coating systems are U.S. Pat. Nos. 3,383,242 and 3,297,468. Such a coating, while chemically modifying the surface of the polyester substrate will not result in substantial physical differences in the nature of the surface of the filament. While such chemical modifications have of course, improved the adhesion of the polyester reinforcing elements for rubber, these modifications have not produced products which exhibit that degree of adhesion for rubber which has already been achieved in rayon and nylon. In addition to insufficient adhesion, the chemical modifications result in a reduced melting point at the surface of the substrate and hence an increased probability of the failure of the reinforcing element under high temperature uses. Moreover, the chemical modification of the surface of the substrate, stiffens the substrate and reduces the fatigue resistance of the product.

Efforts have been made to coat a substrate with a material having improved adhesion to rubber without "curing" or chemically reacting the coating. Such systems however, apply the coating as a terminal operation in the filament processing procedure; that is to say, the coating is applied to a fully drawn yarn, and as such, results in a continuous coating on the filament. Processes such as are set forth in U.S. Pat. No. 3,297,468 result in neither a chemical nor a physical modification of the filament surface; that is to say, there is no discernible difference in the filament after the coating has been stripped.

It is therefore an object of this invention to provide a polyester textile or textile-like element having improved adhesion for rubber.

It is another object of this invention to provide a polyester textile or textile-like element having modified physical surface characteristics and unchanged chemical characteristics.

It is an additional object of this invention to provide a polyester textile or textile-like element having modified physical surface characteristics and a solvent removable surface coating disposed thereon.

It is still another object of this invention to provide a reinforced rubber article having polyester textile or textile-like elements which have modified surface characteristics.

These and other objects of the invention will become more apparent from the following detailed description.

In accordance with this invention, it has now been discovered that polyester textile or textile-like elements having improved adhesion to rubber may be obtained from polyester elements characterized by a high surface energy, and more specifically, a surface energy of greater than 45 dynes per centimeter, a substantially chemically unmodified surface and a discontinuous coating disposed thereon. The polyester shaped articles of this invention may be coated or uncoated shaped articles, the most preferred shaped article being a shaped article having a surface energy greater than 52 dynes per centimeter and having a discontinuous and unreacted epoxy resin coating disposed thereon. For purposes of this invention, the phrase "discontinuous coating" is meant to include any uneven coating which tends to produce islands of the applied materials on the substrate.

The term "surface energy" or "critical surface tension" as employed herein may be defined as the surface tension of a liquid which has the lowest surface tension a liquid can have and still exhibit a contact angle greater than zero degrees on the solid. The value of the surface energy is determined by observing the spreading behavior and contact angle, $\theta$, of a series of liquids of decreasing surface tension, $\gamma$. A rectilinear relation exists between cosine $\theta$ and $\gamma$, the intersept of this line with cosine $\theta = 1$ (i.e. $\theta = $ zero) line gives a value of the surface energy which is independent of the nature of the test liquids and is a parameter characteristic of the solid surface only.

It should be understood that surface energy measurements are made upon the polyester substrate which is free of any coating materials. As previously stated, coated polyester substrates are considered to be within the scope of this invention. However, the coating materials must not be chemically reacted with the polyester substrate and must be amenable to being stripped by means of a suitable solvent in order to allow the surface energy test as set forth herein to be conducted on the polyester substrate.

The polyester substrates with high surface energy are produced by applying a liquid crystallizing agent to the surface of the substrate and then drawing the substrate under conditions such as to inhibit chemical reaction between the substrate and the crystallizing agent.

For purposes of this invention, the term "crystallizing agent" may be defined as any substance which, when applied to amorphous polymer as a liquid, solution, emulsion or dispersion, in a suitable carrier, will at least partially crystallize the polymer. The preferred crystallizing agents are materials with low vapor pressures at elevated temperatures that will not evaporate from the surface of the yarn during processing. As there are normally high molecular weight materials that do not readily penetrate into the polymer, they may only crystallize a thin surface layer, this is sufficient to ultimately produce a high surface energy yarn.

The crystallizing ability of a material can often be predicted from its cohesive energy density or solubility parameter (W.R. Moore and R.P. Sheldon, *Polymer*, 2, 315 (1961)); materials with cohesive energy densities close to that of the polymer at the test temperature acting as crystallizing agents. The crystallizing action is also affected by polarity, hydrogen bonding and structure. The crystallizing agents usually also act as swelling agents and dye carriers.

The most convenient method to determine if a substance is a crystallizing agent is to immerse an amorphous polymer film in the substrate (if it is a liquid) or in a solution, emulsion or dispersion of the substance, at the test temperature, and, after a suitable time remove the film and clean off the crystallizing agent using a non-crystallizing volatile liquid (e.g. cold ethanol) which is then allowed to evaporate. The crystallinity of the film is then measured using Attenuated Total Reflectance Infra Red Spectroscopy (E. L. Lawton and D. M. Cates, *Journal of Applied Polymer Science*, 13, 899 (1969)). Other methods of measuring crystallinity (e.g. density, X-ray diffraction) may not detect thin, porous crystalline layers at the surface of the film.

The term "polyester" as employed herein is deemed to include any highly polymeric linear ester obtained by heating one or more glycols of the series $HO(CH_2)_nOH$ where n is greater than 1 but not exceeding 10, with a dicarboxylic and preferably terephthalic acid or an ester forming derivative thereof. The phrase "highly polymeric linear esters" may be defined as polyesters which are capable of molecular orientation as shown by characteristic X-ray patterns, by drawing or rolling. Examples of ester-forming derivatives of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols. The preferred polyester for purposes of this invention is polyethylene terephthalate. The improved adhesion obtained according to the teachings of this invention may be obtained with all polyethylene terephthalate polymers regardless of their carboxyl end groups content or diethylene glycol content. The effect of coating an underdrawn substrate is to increase the virgin surface of the substrate during drawing in the presence of the coating. The substrate is preferably a continuous filament, however as previously mentioned all textile or textile-like substrates are suitable for use in conjunction with this invention. Especially preferred among the continuous filament substrates are the reinforcing element such as tire cord.

As previously mentioned, the crystallizing agent may be stripped from the substrate, but is preferably, allowed to remain on the substrate as a coating. Crystallizing agents which are preferred as permanent coatings on the polyester substrate are epoxy resins having more than one epoxide group per molecule. More specifically, three classes of epoxy resins have been found to be especially suitable, these resins being aliphatic glycidyl ether, aromatic glycidyl ester and aromatic glycidyl ether. The most preferred class of epoxy resins are those with a weight per epoxide of 200 or less and a molecular weight of less than 500. These ranges are based on requirements of the process and not on the adhesion obtainable. High molecular weight resins are insoluble in water and difficult to emulsify. With high weights per epoxide high concentrations of resins on yarn would be required to give sufficient epoxide groups on yarn for adhesion. These high on yarn concentrations would be difficult to obtain and would result in build-up resin and finish on the hot rolls or plates of the drawing equipment.

The polyether and polyester polyepoxides which may be employed in this invention comprise those compounds possessing a plurality of 1,2-epoxy groups (i.e.,

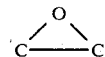

groups). These polyether or polyester polyepoxides, more detailed description of which appears in U.S. Pat. No. 2,829,071, may be saturated or unsaturated, aliphatic, cycloaliphatic, aromatic or heterocyclic and may be substituted if desired with various substituents, such as halogen atoms, hydroxy groups, ether radicals, and the like. They may also be monomeric or polymeric.

Polyether polyepoxides which may be added in this invention may be exemplified by 1,4-bis(2,3-epoxypropoxy) benzene; 1,3-bis(2,3-epoxypropoxy)benzene; 4,4'-bis(2,3-epoxypropoxy)diphenyl ether; 1,3-bis(2,3-epoxypropoxy) octane; 1,4-bis(2,3-epoxypropoxy)cyclohexane; 4,4'-bis (2-hydroxy-3,4-epoxybutoxy)diphenyldimethylmethane; 1,3-bis(4,5-epoxypentoxy)-5-chlorobenzene; 1,4-bis(3,4-epoxybutoxy)2-chlorocyclohexane; ethylene glycol diglycidyl ether, resorcinol diglycidyl ether and 1,2,3,4-tetra (2-hydroxy-3,4-epoxybutoxy)butane.

Other examples include the glycidyl polyethers of polyhydric phenols obtained by reacting a polyhydric phenol with an excess, e.g., 4 to 8 mole excess of a chlorohydrin, such as epichlorohydrin and dichlorohydrin. Other polyhydric phenols that can be used for this purpose include resorcinol, catechol, hydroguinone, methyl resorcinol, polynuclear phenols, such as 2,2-bis(4-hydroxyphenyl)butane; 4,4'-dihydroxybenzophenone; bis(4-hydroxyphenyl)ethane; and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl) dimethylmethane; 1,4-dimethylolbenzene; 4,4-dimethyloldiphenyl, dimethylol toluenes and the like. The polyhydric ether alcohols include, among others, diglycerol, triglycerol, di-pentaerythritol, tripentaerythritol, dimethylolanisoles, beat hydroxyethyl ethers of polyhydric alcohols, such as diethylene glycols, polyethylene glycols; bis(beta hydroxyethyl ether) of hydroquinone; bis (beta hydroxyethyl ether) of bisphenol; beta hydroxyethyl ethers of glycerol, pentaerythritol; sorbitol; mannitol; etc; condensates of alkylene oxides, such as ethylene oxide; propylene oxide, butylene oxide; isobutylene oxide; glycidol; epichchlorohydrin; glycidyl ethers, etc. with polyhydric alcohols, such as the foregoing and with polyhydric thioethers, such as 2,2'-dihydroxydiethyl sulfide; 2,2'-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alphamonothioglycerol, alpha, alpha'-dithioglycerol, etc. The polyhydric alcohol esters may be exemplified by monoglycerides, such as monostearin, monoesters of pentaerythritol and acetic acid, butyric acid, pentanoic acid and the like. The halogenated polyhydric alcohols may be exemplified by the monochloride of pentaerythriol, monochloride of sorbitol, monochloride of mannitol, monochloride of glycerol, and the like.

Other polyether polyepoxides include the polyepoxypolyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bisphenol and bis(2,3-epoxy-2-methylpropyl) ether, the reaction product of resorcinol and bis(2,3-epoxy propyl)ether, and the reaction product of catechol and bis (2,3-epoxypropyl) ether.

A group of polymeric-type polyether polyepoxides comprises the hydroxy-substituted polyepoxide polyethers obtained by reacting preferably, in an alkaline medium, a slight excess, e.g., 0.5 to 3 mole excess, of a halogen-containing epoxide, such as epichlorohydrin, with any of the aforedescribed polyhydric phenols, such as resorcinol, catechol, 2,2-bis(4'-hydroxyphenyl) propane, bis[4-(2'-hydroxynapth-1-yl)-2,2-hydroxynapth-1-yl]methane and the like.

Other polymeric polyether polyepoxides include the polymers and copolymers of the allylic ether of epoxy containing alcohols. When this type of monomer is polymerized in the substantial absence of alkaline or acidic catalysts, such as in the presence of heat, oxygen, peroxy compounds, actinic light, and the light, they undergo additional polymerization at the multiple band leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate and vinyl methallyl pimelate. Illustrative examples of these polymers include poly(allyl 2,3-epoxypropyl ether), allyl 2,3-epoxypropyl etherstyrene copolymer methallyl 3,4-epoxybutyl ether-allyl, benzoate copolymer poly(vinyl 2,3-epoxypropyl) ether and allyl glycidyl ether vinyl acetate copolymer.

Polyester polyepoxides suitable for use in the process of this invention include polyglycidyl esters of aliphatic and aromatic dicarboxylic acids such as for instance, diglycidylorthophthalate, diglycidylisophthalate, diglycidyladipate, diglycidylazelate and diglycidyl ester of hexahydrophthalic acid.

Specific crystallizing agents other than epoxides which are suitable for this invention are crystallizing agents such as for instance, polyvinyl alcohol, polyvinyl acetate and polyethylene glycol-polyethylene terephthalate copolymer.

It is thought that the epoxy resin or other crystallizing agent applied to the amorphous substrate crystallizes the surface of the yarn and in doing so, produces a porous layer on the surface. The intersection of the pores with the surface are believed to produce a rough surface with an increase surface energy. The crystallizing action may continue on the partially drawn, partially crystallized substrate as it progresses through the process. It is further though that the continued presence of the epoxy resin or other crystallizing agent is necessary to prevent collapse of the pores during the latter stages of the process.

A better understanding of the invention may be had from the drawings wherein

The following specific examples are given for purposes of illustration. The examples should not, however, be considered as limiting the spirit or scope of this invention.

EXAMPLE I

Figure 2:
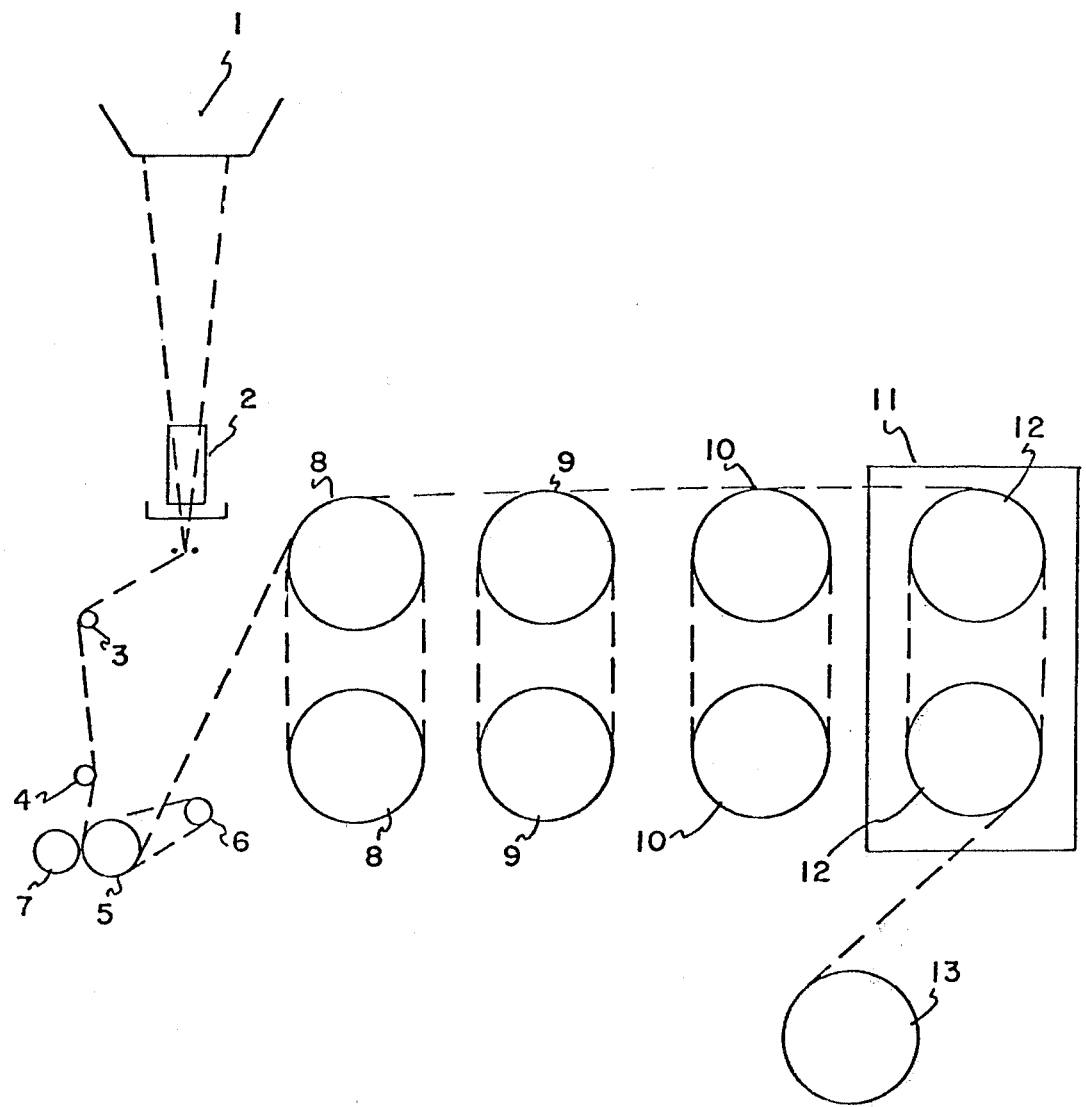
FIG. 2 is a schematic illustration of a spin draw process as employed in conjunction with the adhesive priming process for producing the product of this invention.

1330/192 polyester tire yarn is made using the continuous spin draw process illustrated in FIG. 2. Turning to FIG. 2, it can be seen that a continuous spin draw process is carried out by extruding polyester polymer of suitable melt viscosity into a finish roll and tray assembly 2, the tray containing an epoxy resin finish. The undrawn yarn is passed over first idler roll 3 and then over second idler roll 4 and then around pre-tensioning rolls 5 and 6 equipped with nip roll member 7. The yarn is then passed around a heated pair of feed rolls 8 and then around a first pair of draw rolls 9. From the first pair of draw rolls, the yarn is passed around a second pair of draw rolls 10 and then into a heated chamber 11 containing a third pair of draw rolls 12, rolls 12 and chamber 11 being maintained at a higher temperature than the first and second pairs of draw rolls. After the final draw, the yarn is taken up on wind-up unit 13. The finish composition placed in the tray of the finish roll and tray assembly 2 is as follows:

- 5% glycidyl ether made from epichlorohydrin and glycerine (epoxide equivalent 140–160)
- 5% spin finish containing approximately 60% of dimethylpolysiloxanes (average molecular weight 2000)
- 5% spin finish containing 75% ethoxylated sorbitan monooleate (20 moles polyoxyethylene and 25% ethoxylated octophenol (12 moles polyoxyethylene)
- 85% water.

The resultant yarn is twisted to give a 3 ply 8×8 cord which was resorcinol formaldehyde latex dipped and heated at 300° F. for 130 second and 435° F. for 70 second. The dipped cord was made into a 1" peel using commercial pneumatic tire green rubber and rubber cured at 325° F. for 15 minutes. These peels gave the following adhesion results:

| 75° F. | 250° F. |
|---|---|
| 59 lb.in. 3+ | 30 lb./in. 3 |

The adhesive strength of the epoxy primer polyester and the epoxy primer resorcinol formaldehyde dip bonds may therefore be considered as at least equal to the cohesive strength of rubber.

This yarn, before twisting, is extracted with acetone so as to remove all of the spin finish and epoxy resin. Removal of the epoxy resin is verified by determination of the % Chlorine (the epoxy resin contains 12%) on yarn before and after extraction using X-ray Flourescence (this showed that more than 95% of the resin had been removed) and examination of the surface before and after extraction using a scanning election microscope.

After extraction the surface energy is measured and is found to be 51 dynes/cm.

EXAMPLE II

Example I is repeated except that the epoxy resin is omitted from the finish, i.e., the finish used is:
5% spin finish containing approximately 60% of dimethylpolysiloxanes (average molecular weight 2000)
5% spin finish containing 75% ethoxylated sorbitan monooleate [20 moles polyoxyethylene and 25% ethoxylated octophenol (12 moles polyoxyethylene)]
90% water This yarn is twisted and tested for adhesion as described in Example I and gave the following results:
250° F.—19 lb/in—0 visual The yarn is then extracted using the procedure of Example I and after extraction has a surface energy of 42.5 dynes/cm.

EXAMPLE III

Example I is repeated except that the adhesive primer spin finishes used are as shown in the following table. These yarns are extracted as in Example I and the surface energy measured. Further the yarns (not extracted) are tested for adhesion as described below. Surface energies are adhesion values are reported in the following table and in FIG. 1.

| FINISH | | SURFACE ENERGY | AD-HESION*** |
|---|---|---|---|
| 8% "EPONITE 100"* 16% Spin Finish** 0.16% Na₂CO₃ | A | 53 dynes/cm | 24 lb./in. (Cohesive Failure of Rubber) |
| 6% "EPONITE 100"* 12% Spin Finish** 0.12% Na₂CO₃ | B | 51 dynes/cm. | 20 lb./in. |
| 4% "EPONITE 100"* 8% Spin Finish** 0.08% Na₂CO₃ | C | 49 dynes/cm. | 15 lb/in. |
| 2% "EPONITE 100"* 4% Spin Finish** 0.04% Na₂CO₃ | D | 46.5 dynes/cm. | 10.5 lb./in. |
| 10% Spin Finish** 0.1% Na₂CO₃ | E | 43 dynes/cm. | 7 lb./in. |

*Water dispersible liquid epoxy resin manufactured by Shell Chemical Company.
**Equal parts of a spin finish containing approximately 60% of dimethylpolysiloxanes (average molecular weight 2000) and a spin finish containing 75% ethoxylated sorbitan monooleate (20 moles polyoxyethylene) and 25% ethoxylated octophenol (12 moles polyoxyethylene)
***Adhesion was measured by the method of Example I except that the peel strip was heat aged at 300° F. for 6 hours before being pulled at 250° F.

Figure 1:
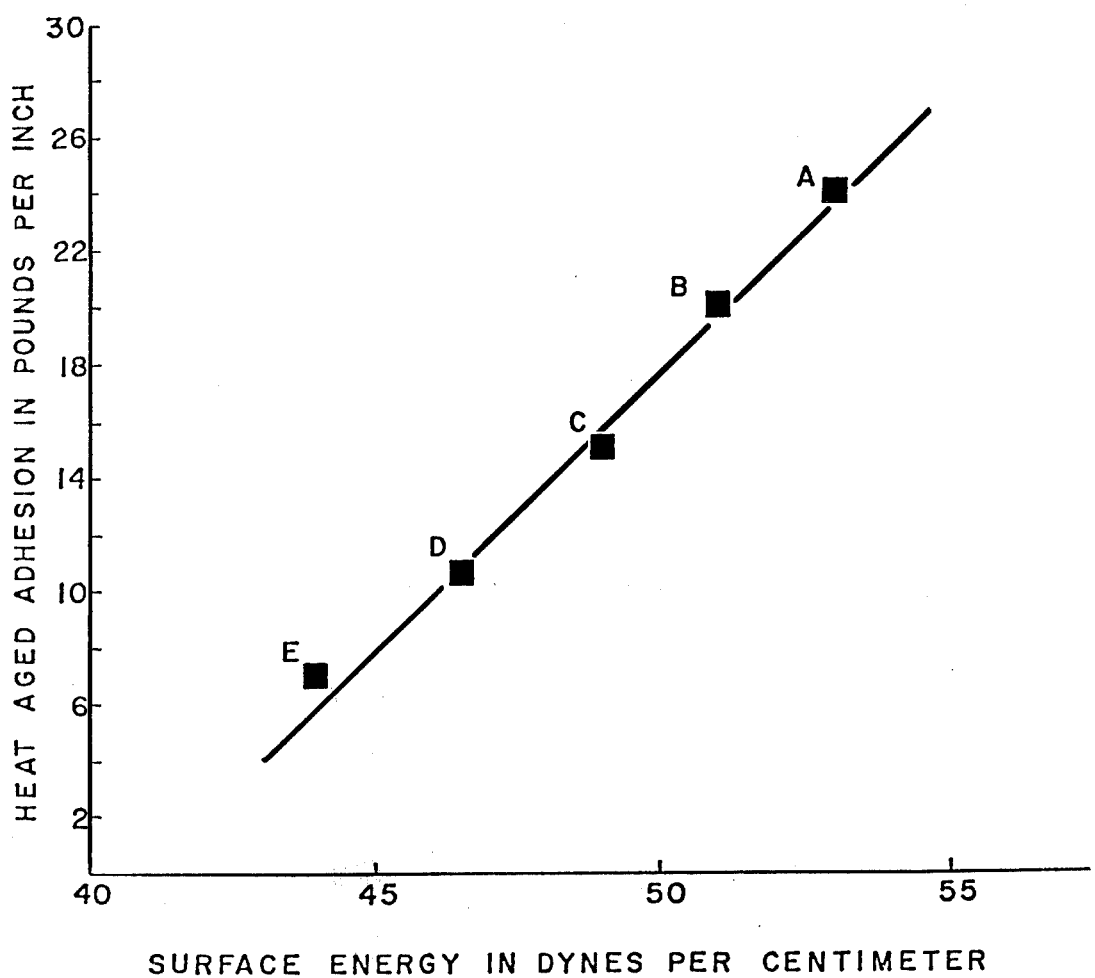
FIG. 1 is a graph plotting surface energy against adhesion.

When the data obtained from the finishes designated as A,B,C,D and E of Example VI are plotted in FIG. 1 using surface energy in dynes per centimeter as the X axis and heat aged adhesion in pounds per inch on the Y axis, full appreciation of the improved adhesion on increasing surface energy is obtained. The peel adhesion tests were made using commercially available green rubber, the samples being aged at about 300° F. for six hours. A detailed discussion of the peel adhesion testing procedure and the composition of commercial green rubber stock will be given hereinafter.

EXAMPLE IV 3500-7 (500 denier per filament) polyethylene terephthalate yarn is made, using the continuous spin draw process illustrated in FIG. 2, and the process as set forth in Example I, except that an epoxy coating composition is employed, having the following composition:
10% glycidyl ether made from epichlorohydrin and aliphatic triol (epoxide equivalent 138-153)
0.3% emulsifier prepared from condensing ethylene oxide onto polyoxypropylene
89.7% water The resultant yarn is twisted to give a 2 turn per inch cord and treated for adhesion according to the procedure set forth in Example I. Peel tests are found to give the following adhesion results:

| 75° F. | 200° F. |
|---|---|
| 47 lb./in., 3+ | 38 lb./in. 3 − |

The yarn is found to have a carboxyl end group concentration of 44 Ue/g.

After extraction, using the procedure of Example I, the yarn is found to have a surface energy of 49 dynes/cm.

EXAMPLE V

Figure 3:
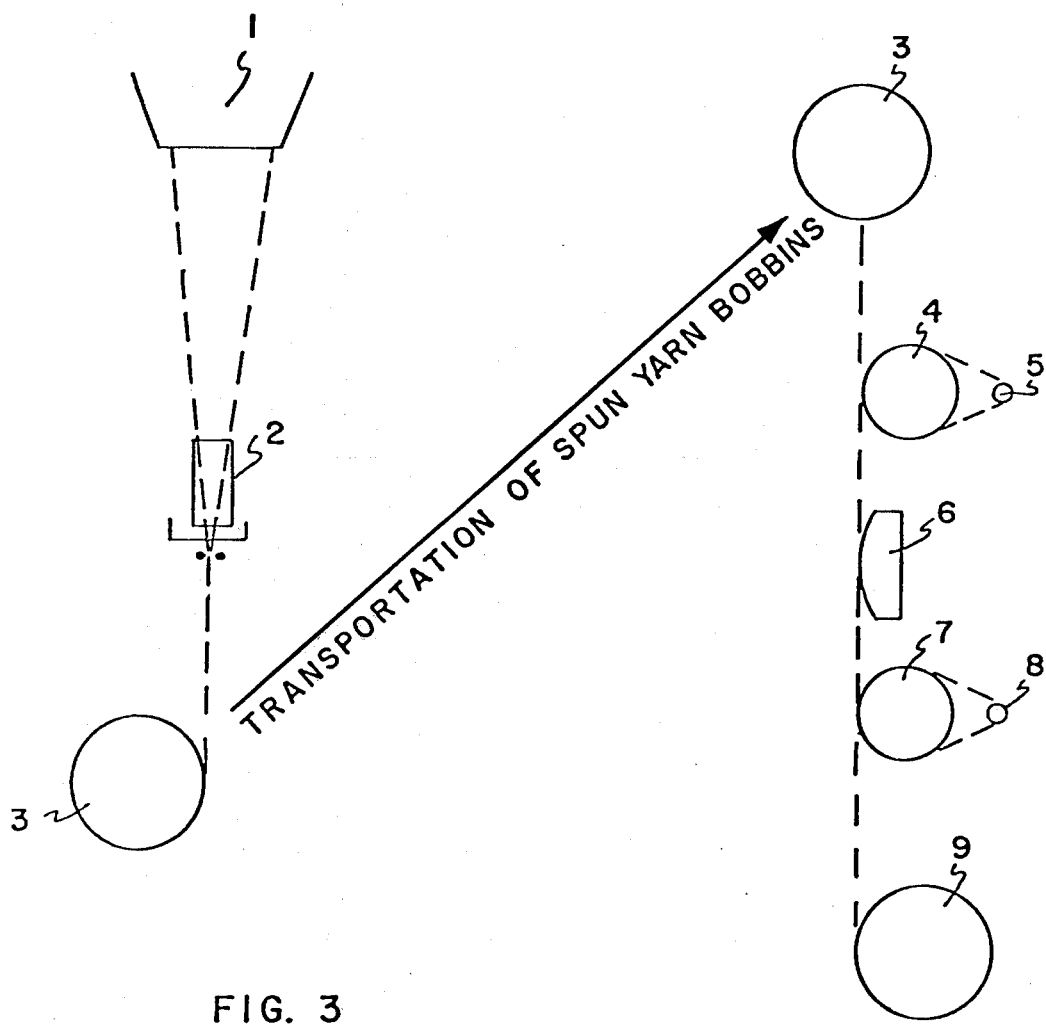
FIG. 3 is a schematic illustration of a draw twisting process is employed in conjunction with the adhesive priming process for producing the product of this invention.

Spun polyethylene terephthalate is produced and then drawn on a draw twister as shown in FIG. 3. Turning to FIG. 3, polyester polymer having a suitable melt viscosity is extruded from pack and spinnerett assembly 1, directly onto finish roll and tray assembly 2. The coated yarn is then wound on a bobbin 3. The bobbin 3 is then transported and mounted in a drawing area where the yarn is passed around a pair of feed rolls 4 and 5, contacted with hot plate 6, passed around draw rolls 7 and 8 and finally wound on the takeup device 9 which may be apparatus such as a ring and follower twister. The spin finish of Example I is employed in the finish roll and tray assembly 2. The yarn is then tested for adhesion using commercial pneumatic tire green rubber to form the test sample. The test sample is found to give the following adhesion results:

| 75° F. | 200° F. |
|---|---|
| 56 lb./in. 3 | 41 lb./in. 2+ |

After extraction the yarn is found to have a surface energy of 51 dynes/cm.

EXAMPLE VI

Example I is repeated except that the finish composition used is as follows:

| | |
|---|---|
| 10% | spin finish containing approximately 60% of dimethylpolysiloxanes (average molecular weight 2000) AND spin finish containing 75% ethoxylated sorbitan monooleate (20 moles polyoxyethylene) and 25% ethoxylated octophenol (12 moles polyoxyethylene) |

9% Polymer 60, (55% polyvinyl acetate emulsion manufactured by Polymer Industries)
81% water Cord from this yarn is found to give adhesion results at 75° F. of 57 lb./in., 3-visual.

The finish and polyvinyl acetate are extracted from the yarn using acetone. After extraction this yarn is found to have a surface energy of 47 dynes/cm.

EXAMPLE VII

The process of Example V is repeated except that polyethylene terephthalate polymer is replaced with the polyester reaction product of ethylene glycol and carboxy phenoxy ethane. Upon subjecting the product to physical tests, substantially identical results to those of Example V are obtained.

EXAMPLE VIII

The procedure of Example I is repeated with the exception that the following finish composition is employed:
6% of a copolymer of 1 mole of polyethylene glycol and 6 moles of polyethylene terephthalate
5% spin finish containing approximately 60% of dimethylpolysiloxanes (average molecular weight 2000)
5% spin finish containing 75% ethoxylated sorbitan monooleate (20 moles polyoxyethylene) and 25% ethoxylated octophenol (12 moles polyoxyethylene)
84% water The resultant yarn when subjected to physical tests is found to have a surface energy of about 50 dynes per centimeter after extraction and a slightly lower adhesion than that exhibited by the yarn of Example I.

While the examples set forth herein have referred to rubber stock as commercially available green rubber, it should be understood that the improvements obtained by the process of this invention are substantially independent of the composition of the commercially available green rubbers. A representative example of a commercial green rubber is as follows:

| Rubber Master Batch | Parts |
|---|---|
| Styrene Butadiene Rubber | 50 |
| Natural Rubber | 50 |
| Carbon black (FEF) | 50 |
| Petroleum Oil | 10 |
| Zinc oxide | 5 |
| Stearic acid | 2.5 |
| | 167.5 parts |

The rubber master batch is then compounded into a final green rubber which is as follows:

| Final Rubber | |
|---|---|
| Rubber master batch | 100 |
| Sulfur | 2.2 |
| Benzothiazole disulfide | 2.0 |

The peel adhesion test mentioned herein is carried out substantially as follows: a layer of green rubber is wrapped around a wind-up drum. This is followed by a layer of cord test sample wound onto the drum, each wind being as closely spaced as possible. Two sections are then cut from the drum and sandwiched with a sheet of green rubber so that each of the two cord layers are faced with rubber. After curing in a stream heated press, the samples are cut into strips and pulled apart under heat on an Instron tensile tester (precision materials testing instrument manufactured by Instron Corp., 2505 Washington Street, Canton, Massachusetts). The average number of pounds to pull the cord layers apart is the measure of the peel resistance of the sample. The procedure for building the peel strip is as follows: place a 1" strip of masking tape, tacky side up, over the desired area of a wind-up drum. Cover the windup drum with approximately 21" lengths of calendered rubber, using a butt joint along the length of the masking tape. Paint the rubber strip with xylene, and lay yarn or cord down on the rubber with each wind being as closely spaced as possible. After a three and one-quarter inch width of fabric has been laid down, it is secured with another small tab of rubber. Pressure is then applied to the fabric by means of the metal roller and the fabric is secured at the splice with another piece of masking tape. The fabric is then cut at the splice and removed from the drum. Samples are then cut into six 3-inch squares. Two pieces of green rubber are then cut into three 3-inch squares. Three pieces of Holland cloth are also cut 3"×1". One 3-inch square of fabric, cords up, is placed on a table top. On top of this rubber laminated fabric, one 3-inch square of green rubber is laid. The 1"×3" strip of Holland cloth is placed on the furthermost top of the green rubber aligning the edges. Another 3-inch square of rubber laminated fabric is placed on top of the Holland cloth with the cords of the laminate placed down. After assuring that the cords of the fabric are parallel with each, the sample is ready for curing. The curing is accomplished by preheating a steam heated press to 330° F. An empty peel mold is placed in the press, and steamed for 20 minutes. The sample is then placed in one of the four mold cavities of the peel mold with the remaining three cavities containing dummy samples. The mold with the top in place is held in the press for fifteen minutes at 300° F. with four tons of pressure. After fifteen minutes, the mold is removed from the press. The Holland cloth is removed so that cord layers at the sample extremity are exposed. Measurements are made in an Instron machine to determine pounds of pull necessary to delaminate the two cord layers of the sample, the jaws of the Instron machine grasping the exposed ends of the cord layer.

in addition to expressing results as the force required to pull the test specimen apart, a visual rating of the pulled sample is given according to the following scale:

Visual:
3+ Deep Rubber Failure
3 95 to 100% Rubber Failure
3− 80 to 95% Failure
2+ To 80% Failure
2 80% Rubber Failure
2− To 40% Failure
1+ 20% Rubber Failure
1 10% Rubber Failure
1− Dip to Rubber Failure
0 Dip to Cord Failure

What is claimed:

1. A saturated polyester filament having a porous layer on the surface thereof, said surface being chemically unmodified and exhibiting a surface energy greater than 45 dynes per centimeter and having a generally porous surface characterized in that said pores intersect with said surface and are predominantly less than about 200 Angstroms in major dimensions.

* * * * *